(12) United States Patent
Lenning (10) Patent No.: US 8,231,073 B2
(45) Date of Patent: Jul. 31, 2012

(54) LOAD LIMITING SEAT BELT RETRACTOR

(75) Inventor: Anders Lenning, Kungsbacka (SE)

(73) Assignee: Autoliv Development AB, Vargarda (SE)

( * ) Notice: Subject to any disclaimer, the term of this patent is extended or adjusted under 35 U.S.C. 154(b) by 824 days.

(21) Appl. No.: 10/574,035

(22) PCT Filed: Sep. 15, 2004

(86) PCT No.: PCT/SE2004/001325
§ 371 (c)(1),
(2), (4) Date: May 2, 2007

(87) PCT Pub. No.: WO2005/032894
PCT Pub. Date: Apr. 14, 2005

(65) Prior Publication Data
US 2007/0228204 A1  Oct. 4, 2007

(30) Foreign Application Priority Data
Oct. 6, 2003 (GB) .................................. 0323361.6

(51) Int. Cl.
*B60R 22/28* (2006.01)
*B60R 22/36* (2006.01)
(52) U.S. Cl. ................................................... 242/379.1
(58) Field of Classification Search .............. 242/379.1; 280/805, 807; 297/471, 472, 475–478
See application file for complete search history.

(56) References Cited

U.S. PATENT DOCUMENTS

| | | | | |
|---|---|---|---|---|
| 4,240,924 A | * | 12/1980 | Block | 252/363.5 |
| 5,799,893 A | | 9/1998 | Miller, III et al. | |
| 6,616,081 B1 | * | 9/2003 | Clute et al. | 242/379.1 |
| 7,318,560 B2 | * | 1/2008 | Clute | 242/379.1 |
| 2003/0201357 A1 | * | 10/2003 | Koning et al. | 242/379.1 |

FOREIGN PATENT DOCUMENTS

| | | |
|---|---|---|
| DE | 199 27 427 A1 | 1/2001 |
| DE | 101 41 915 C1 | 12/2002 |
| DE | 102 34 708 A1 | 2/2003 |
| WO | WO 98/36951 | 8/1998 |

* cited by examiner

*Primary Examiner* — Michael Mansen
*Assistant Examiner* — Scott Haugland
(74) *Attorney, Agent, or Firm* — Brinks Hofer Gilson & Lione (57) ABSTRACT

A seat belt retractor incorporating a force limiter to permit the restricted paying out of a seat belt webbing and a control mechanism for controlling the force limiting functions of the retractor. The arrangement includes a two part spindle within a retractor. On a first part of the spindle the safety belt is wound. A second part of the spindle is configured to be locked by a retractor locking device. The two spindle parts are interconnected by a belt load limiting torsion bar. The torsion bar has two sections of different torsional stiffness. The junction between the two torsion bar sections is releasably connected to part of the spindle. When the connection is present one energy absorbing level is provided and when the connection is controlled there is another energy absorbing level. The connection is broken in response to a relative movement between the two spindle parts caused by an initial belt force in excess of a predetermined force. When the initial belt load is less than a predetermined force, the control mechanism shifts from the first to the second load level. When the initial belt load is greater than the predetermined load level, the control mechanism maintains the first load level.

18 Claims, 6 Drawing Sheets

LOAD LIMITING SEAT BELT RETRACTOR

CROSS REFERENCE TO RELATED APPLICATIONS

This application claims priority to Great Britain patent application serial number 032261.6, filed Oct. 6, 2003 and PCT/SE2004/001325, filed Sep. 15, 2004.

FIELD OF THE INVENTION

The present invention relates to a safety device, and more particularly relates to a seat belt retractor for use with a vehicle seat belt.

BACKGROUND AND SUMMARY OF THE INVENTION

It has been proposed to provide seat belts and also air-bags for use in a motor vehicles to restrain seat occupants during an accident situation. It is known that, for the front seat occupants in a vehicle, if the seat belt and/or air-bag can prevent an occupant from reaching the dashboard or steering wheel in front of the seat during an accident, then the risk of injury to the seat occupant may be minimised.

In any accident situation, the energy that has to be absorbed by the seat belt and/or air-bag to prevent a seat occupant from reaching the dashboard depends upon a number of different factors, including the severity of the accident or, in other words, the degree of deceleration experienced by the vehicle, and also the weight of the seat occupant. It is clear that more energy has to be absorbed by a heavy person than if the seat is occupied by a light person in a particular accident situation. Also, more energy has to be absorbed in a severe high speed accident than in a low speed accident.

It has been proposed to utilise a force limiter associated with a seat belt for a seat occupant, the force limiter having an adjustable force level so that the energy absorbed by the force limiter may be adjusted. For example, the force limiter may have a force level or energy absorption level that can be changed from a high level to a lower level at a designated time period after commencement of an accident situation, or which can be changed in response to a signal indicative of the severity of a particular accident.

It is to be understood that, generally speaking, a heavy person may be capable of withstanding a much higher energy absorption level than a light person. However, it is always desirable to keep the energy absorption level applied to any seat occupant as low as possible. If a high energy absorption level is necessary, then that high energy absorption level should be used for as short a time as possible.

It has been proposed to control the energy absorption level of a seat belt force limiter by using weight sensors which determine the weight of a seat occupant, the weight sensors providing signals to a control unit, with the control unit then selectively adjusting the energy absorption level of the force limiter. The control unit may control the energy absorption level not only in dependence upon the weight of the seat occupant, but also in dependence upon the severity of the accident. However, such a sophisticated control arrangement is very expensive to implement.

The present invention seeks to provide an improved safety device.

According to this invention there is provided a seat belt retractor incorporating a seat belt force limiter to permit the restricted paying out of a safety belt with the absorption of energy, the force limiter having a first relatively high energy absorbing levels and a second relatively low energy absorbing level, there being a control mechanism operable to select the energy absorbing level in response to a crash related electric signal. The control mechanism being in the form of a mechanical arrangement, responsive to a relative movement between two components of the safety device caused by an initial belt force in excess of a predetermined force, the mechanical arrangement directly inhibiting the effective selection of the second relatively low energy absorbing levels by the control mechanism.

Preferably the control mechanism is operable to select the second relatively low energy absorbing level and the arrangement responsive to an initial belt force is operative to inhibit effective selection of the said second relatively low energy absorbing level. Because the mechanical arrangement directly inhibits the effective selection of the second low energy absorbing level, without the generation and processing of any electric control signals, a very fast acting operation may be achieved, and at a relatively low cost.

Preferably the retractor includes a two-part spindle within the retractor, a first part of the spindle being adapted to be locked, a second part of the spindle having the safety belt wound around it, the arrangement being such that the second part of the spindle may move relative to the first part when the initial belt force in excess of said predetermined force applied, the movement of the second part of the spindle relative to the fixed first part of the spindle actuating the arrangements which inhibits one of the energy levels.

Conveniently the second part of the spindle is connected to the first part of the spindle by means of an energy absorbing torsion bar, the energy absorbing torsion bar having two sections, a first section being operative to provide said first relatively high energy absorbing level and a second section being operative to provide said second relatively low energy absorbing level.

Preferably the control mechanism incorporates a locking element and an inhibiting element, the inhibiting element engaging part of the torsion bar between the first and the second section thereof, the locking element initially engaging part of the inhibiting element and the second part of the spindle to secure the inhibiting element to the second part of the spindle, the locking element being moveable to a release position in which the locking element does not secure the inhibiting element to the second part of the spindle.

Conveniently the locking element is a radially moveable locking element, the locking element initially being retained in an engaged position by means of a blocking element located adjacent one end of the locking element, the mechanism being configured to move the blocking element to a release position in response to the crash related electric signal.

Preferably the blocking element is in the form of a ring.

Advantageously the blocking element is moveable in response to the generation of gas by a pyrotechnic squib.

Alternatively the pyrotechnic squib is positioned to direct gas directly to the blocking member.

Conveniently there is a control element, the squib being positioned to direct gas to the control element to move the control element so that the movement of the control element moves the blocking element to the release position.

Advantageously the pyrotechnic squib is associated with at least one gas duct formed in the first part of the spindle and at least one gas duct in the second part of the spindle, the two gas ducts initially being co-aligned, so that a flow of gas may flow through both gas ducts to cause movement of the blocking element, the first part of the spindle being moveable relative to the second part of the spindle in response to the initial belt force in excess of a predetermined value, thus off-setting the gas flow ducts to prevent the flow of gas.

Preferably there are a plurality of the gas ducts in the first part of the spindle and a corresponding plurality of the gas flow ducts in the second part of the spindle.

Conveniently the blocking element is located adjacent a stop, the blocking element in one orientation being moveable past the stop, the blocking element, in any other orientation, not being moveable past the stop, the orientation of the blocking element being mounted to the second part of the spindle to be moveable with the second part of the spindle.

Advantageously the blocking element is in the form of a ring, the ring being provided with at least one inwardly directed finger, the finger being received within an axially extending groove formed in an outer region of the second part of the spindle.

Preferably the stop is formed on the first part of the spindle.

Conveniently two diametrically opposed stops are provided, each of a predetermined configuration, and the ring shaped blocking element is provided with two cut outs of corresponding shape and configuration.

Preferably wires are provided to supply the electric signal, a part of at least one wire extending from the first part of the spindle to the second part of the spindle, the part of the wire being configured to be broken on relative movement of the second part of the spindle relative to the first part.

Advantageously the inhibiting element is provided with a deformable portion which is configured to be deformed in response to relative movement of the second part of the spindle to a first part of the spindle, the deformable part being positioned to co-operate with a correspondingly configured part of the second part of the spindle, to engage the deformable part with the second part of the spindle so as to inhibit effective selection of said one of the energy levels.

Conveniently the deformable part is in the form of a deformable finger, the finger being deformed into a shaped recess provided within part of the second part of the spindle.

DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

In the described embodiments of the invention, a safety device in the form of a seat belt retractor is provided, the retractor having a spindle formed from a spindle body and a spindle head, the spindle being mounted for rotation and having part of the seat belt wound around the spindle. The spindle head is associated with a lock which serves to lock the spindle head to part of the chassis in the event that an accident occurs. A torsion bar arrangement extends between the spindle head and the spindle body so that, when the spindle head is locked, the spindle body may rotate relative to the spindle head with energy being absorbed by the torsion bar.

The torsion bar is provided with two sections, one section being very stiff and thus providing a high energy absorbance, and the other part being relatively soft and thus providing a relative low energy absorbance. A locking element is provided which is releasable in response to a signal, such as an electric signal from a crash sensor, the locking element initially serving to inhibit the effective operation of the soft section of the torsion bar. The crash sensor may respond to the acceleration of part of the vehicle forming the passenger cabin. The sensor will provide a signal at an earlier instant in a severe crash, than in a gentle or soft crash. The signal is provided when the sensed acceleration exceeds a predetermined threshold value. The locking element may be released to permit effective operation of the soft section of the torsion bar at a predetermined instant during an accident situation. However, if the force applied to the seat belt is sufficient to rotate the body of the spindle by a predetermined amount relative to the head of the spindle during an initial phase in an accident situation, i.e. before the crash sensor generates a signal, release of the locking element is prevented or a separate locking arrangement is actuated so that, in such a situation, only the relatively stiff part of the torsion bar will be operative.

A high force will be applied to the seat belt when the seat occupant is heavy, or when the crash is a severe crash. By selecting the threshold acceleration of the crash sensor appropriately, the high force will be experienced by the belt before the sensor generates a signal, regardless of the severity of the crash, only for a heavy seat occupant. The average or light seat occupant, in a severe crash, will only provide a high force in the belt relatively late in the crash. Thus the stiff part of the torsion bar will only be operative for a heavy seat occupant.

Figure 1:
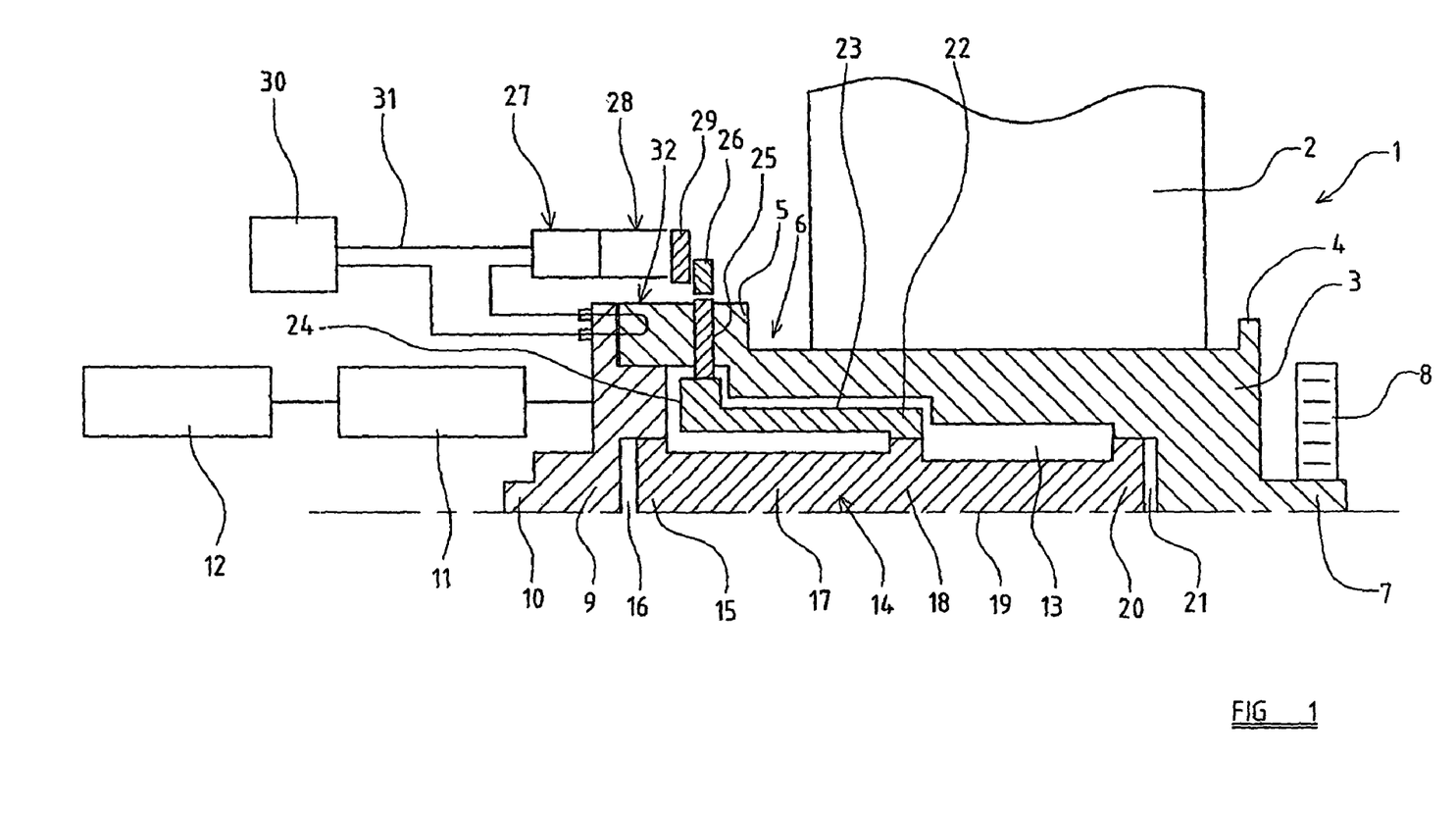
FIG. 1 is a part sectional and part diagrammatic view of one embodiment of a retractor spindle forming a seat belt retractor in accordance with the invention.

Referring initially to FIG. 1 of the accompanying drawings, the operative parts of the spindle a retractor are shown in cross-section. The retractor incorporates a spindle 1 onto which is wound part of a seat belt 2. The spindle 1 incorporates a spindle body 3 provided with spaced apart radially extending flanges 4 and 5 which are of different sizes, but which define between them a trough 6 to receive the seat belt 2. One end of the spindle body 3 defines a trunnion 7 by means which the spindle is rotatably supported, the trunnion 7 being associated with a helical or "clock" spring 8 to bias the spindle 1. At the other end of the spindle body 3, a spindle head 9 is provided, the spindle head 9 defining a second trunnion 10 by means of which the spindle is rotatably supported. The spindle head 9 is mounted to the spindle body 3 so as to co-rotate with the spindle body 3 during ordinary operation of the retractor.

The spindle head 9 is associated with a spindle lock 11 which responds to an accident situation such as an inertial force, or a potential accident situation, to lock the spindle head 9 relative to part of the chassis 12 of the vehicle or retractor to prevent rotation of the spindle head to prevent the free paying-out of the seat belt 2.

The interior of the spindle 1 defines a cavity 13. Contained within the cavity 13 is an axially extending torsion bar or tube 14. The torsion bar 14 has a first enlarged end region 15 which is provided with peripheral keyways or protrusions, the end region 15 being received within a correspondingly configured recess 16 provided on the interior of the spindle head 9, so that the end region 15 of the torsion bar 14 is securely and non-rotatably connected to the spindle head 9. It is thus to be understood that when the spindle head 9 is locked by the lock 11 to the chassis 12, the head 15 of the torsion bar 14 cannot rotate.

Extending from the head 15 of the torsion bar is a relatively stiff first region 17 of the torsion bar, which provides a high energy absorption level. At an approximately central point of the torsion bar 14 an enlarged radius portion 18 is provided, the enlarged radius portion 18 having a peripheral keyways or projections. Extending from the central portion 18 of the torsion bar 14 is a second torsion bar region 19, this torsion bar being of lesser diameter or being of softer material than the stiff torsion bar region 17, the torsion bar region 19 thus being a relatively "soft" region (in terms of torsional stiffness). This region 19 will provide a lower energy absorption level. The second region 19 of the torsion bar terminates with an enlarged end part 20, the end part 20 being provided with peripheral keyways or recesses, the end part 20 being received within a correspondingly configured recess 21 provided in the spindle body 3 adjacent the trunnion 7. It is thus to be appreciated that the end 20 of the torsion bar 14 will co-rotate with the spindle body 3.

The exterior of the enlarged portion 18 of the torsion bar 14 is engaged with a correspondingly configured end portion 22 of a tube 23 which surrounds the first or stiff section 17 of the torsion bar 14. The tube 23 acts as an inhibiting element which can inhibit effective operation of the second relatively less stiff section 19 of the torsion bar. The other end 24 of the tube is enlarged and has an exterior surface configured to engage a radially moveable locking element 25, the locking element 25 passing radially through a bore provided in part of the flange 5 of the spindle body 3 which surrounds the cavity 13. There may be two or more locking elements 25. The configuration of the end part 24 of the tube 23 and the radially innermost end of the locking element 25 is such that when the inner end of the locking element 25 engages the exterior of the end 24 of the tube 23 the tube 23 cannot rotate relative to the spindle body 3. However, the locking member 25 may move radially outwardly, thus becoming disengaged from the end 24 of the tube 23, then permitting the tube 23 to rotate relative to the spindle body 3. The locking element 25 may be spring biased radially outwardly, or, alternatively, the radially inner end of the locking element 25 may be contained within a recess formed in the periphery of the end part 24 of the tube 23 which has at least one sloping wall such that relative rotation between the end part 24 of the tube 23 and the spool body 3 causes the locking element to be driven radially outwardly thus becoming disengaged from the end part 24 of the tube 23.

A blocking element in the form of blocking ring 26 is provided which is initially located immediately adjacent the radially outermost end of the locking element 25 where it projects through the radially outermost part of the flange 5 provided on the spool body 3. The blocking ring 26 is initially positioned so that the blocking ring prevents the locking element 25 from moving radially outwardly to the release position in which the locking element 25 is disengaged from the end part 24 of the tube 23.

Associated with the blocking ring 26 is a pyrotechnic squib 27, the squib 27 being associated with a gas directing tube 28 to direct gas from the squib to a control ring 29, the control ring 29 initially being located adjacent the blocking ring 26. It is to be appreciated that on actuation of the squib, gas will flow through the tube 28, and will move the control ring 29 so as to displace the blocking ring 26 from its initial position, then permitting the locking element 25 to move radially outwardly to the release position.

The squib 27 is controlled by a control signal from a controller 30, the signal passing through wires 31. One of the wires 31 has a loop 32 which extends through part of the spindle head 9, and through part of the spindle body 3. It is to be appreciated that if the spindle body 3 moves relative to the spindle head 9, then the loop 32 will be broken, thus inhibiting actuation of the pyrotechnic squib 27 even if a control signal is generated by the controller 30.

It is to be envisaged that in ordinary operation of the retractor illustrated in FIG. 1, the spindle 1 will tend to wind in the seat belt 2 under the influence of the spring 8. Ordinarily the belt may be pulled out from the retractor and will be rewound into the retractor under the biasing effect provided by the spring 8. Should the vehicle decelerate, the lock 11 may lock, thus locking the spindle head 9 to chassis 12.

In the event that a major accident occurs, the lock 11 will lock the spindle head 9 to the chassis 12. The seat occupant will be thrown forwardly and a force will be applied to the seat belt 2. The force will tend to rotate the spindle 1, but free rotation of the spindle is prevented by the locking effect provided by the lock 11. For a heavy seat occupant a high force level will be generated in the seat belt 2, corresponding to the torque level of the stiff section 17 of the torsion bar at an early instant in the crash, before a signal is generated by a crash sensor connected with controller 30. This force will tend to cause the spindle body 3 to rotate relative to the locked spindle head 9, thus causing the stiff section 17 of the torsion bar 14 to absorb energy and become slightly "twisted", since the engagement between the flange 5 and the end part 24 of the tube 23 effected by the locking element 25 will ensure that the tube 23 rotates simultaneously with the spindle body 3, thus ensuring that the enlarged portion 8 of the torsion bar 14 rotates with the spindle body 3. Thus, the relatively stiff section 17 of the torsion bar will become twisted. As a consequence of the relative movement between the spindle body 3 and the locked spindle head 9, the loop 32 of wire will be broken. Even if, at a subsequent stage during the accident, a signal is generated by the control unit 30, the squib 27 will not be actuated. Thus only the relatively stiff section 17 of the torsion bar will be operative.

On the other hand, if the accident is a relatively "gentle" accident, or if in a severe accident the seat occupant is of average weight or light, the force applied by a seat occupant to the seat belt 2 during the initial stage of the accident before the crash sensor generates a signal will be less than a predetermined torque level applied to the stiff part 17 of the torsion bar. The force will not be sufficient to rotate the spindle body 3 relative to the locked spindle head 9, and thus the loop 32 will be undamaged when the crash sensor operates the signal.

At a subsequent stage during the accident the controller 30 generates a control signal which is passed by the wires 31 to the squib 27. The squib 27 will ignite, generating gas which is directed by the tube 28 to the control ring 29. The control ring 29 moves to displace the blocking ring 26. Since the blocking ring 26 is displaced the locking element 25 may move outwardly under a spring bias, if such a spring bias is provided, or will at least be free to move outwardly. Because the locking elements 25 may move outwardly, and the tube 23 no longer acts to retain the central enlarged diameter portion 18 of the torsion bar 14 in a fixed position relative to the spindle body 3. Consequently the only effective connection between the spindle body 3 and the locked spindle head 9 is the entire length of the torsion bar and thus sections 17 and 19 act in series, since one enlarged end 15 of the torsion bar is connected to the spindle head 9 and the other enlarged end 20 of the torsion bar 14 is connected to the spool body 3. Any rotational force applied to the spool body 3 will thus tend to twist the relatively small diameter or relatively soft section 19 of the torsion bar, which will absorb energy, but only at a relatively low level. In this condition, stiff section 17 is also torsionally loaded, but its deflection does not result in significant energy absorption.

It is thus to be appreciated that in the described embodiment of the invention if the seat occupant is heavy, the force initially applied to the safety belt 2 will ensure that, during subsequent stages of the accident, deployment of the relatively soft or smaller diameter section 19 of the torsion bar is effectively prohibited or inhibited. However, if the seat occupant is of average weight or light, the relatively soft or small diameter section 19 of the torsion bar may become operative.

Figure 2:
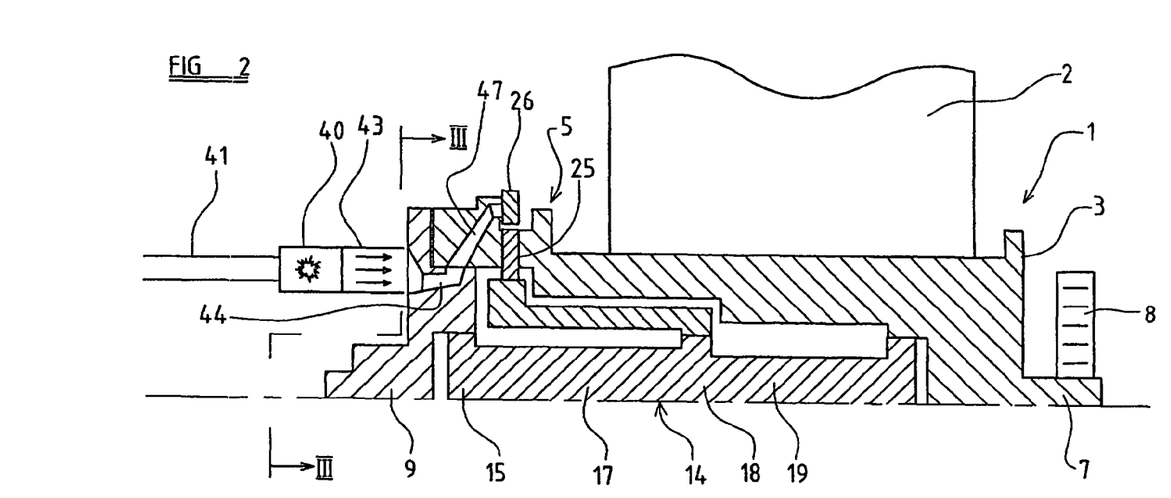
FIG. 2 is a view corresponding to FIG. 1 illustrating a modified embodiment of the invention.

Turning now to FIG. 2 of the accompanying drawing a modified embodiment of a retractor in accordance with this invention is illustrated. Whereas, in the embodiment of FIG. 1, rotation of the spindle body 3 relative to the fixed spindle head 9 causes a wire loop to break, in the embodiment of FIG. 2, which in many respects closely resembles the embodiment of FIG. 1, a gas flow passage from the pyrotechnic squib becomes closed off as a consequence of rotation of the spindle body relative to the fixed spindle head 9, thus preventing gas from the squib effecting movement of the blocking ring to a release position when the squib 27 is actuated.

Figure 3:
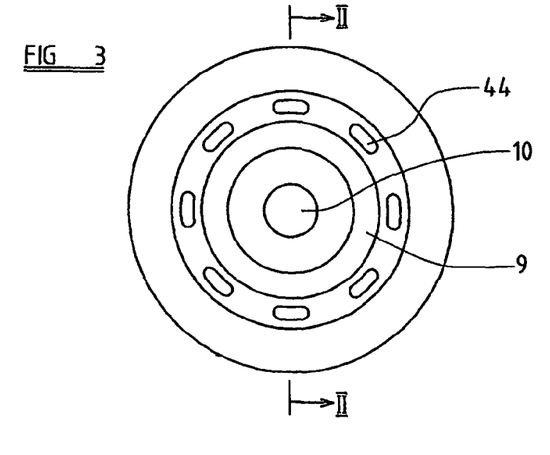
FIG. 3 is a view taken on the line III-III of FIG. 2, with FIG. 3 showing the line II-II forming the section of FIG. 2.
Figure 4:
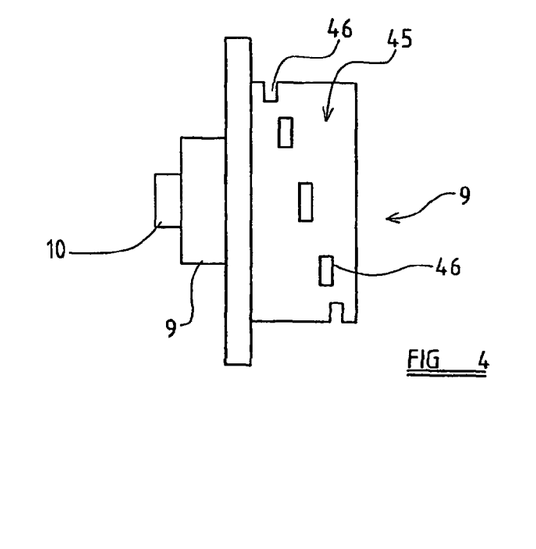
FIG. 4 is a side view of a component of the retractor spindle shown in FIG. 2.

Turning to FIGS. 2 to 4 it is to be noted that the spool 1 is generally as described in the embodiment of FIG. 1, save that the design of the flange 5 has been modified, and also the location of the pyrotechnic squib has been changed.

Elements 1 to 26 of the embodiment shown in FIG. 2 correspond directly with the corresponding elements of FIG. 1 and thus these elements will not be redescribed at this stage.

It is to be noted that in the embodiment of FIG. 2, a pyrotechnic gas generator 40 is provided which receives signal, along wires 41, from an appropriate controller. The pyrotechnic squib is provided with a gas outlet duct 43 which leads to a plurality of gas flow passages 44 provided in the spindle head 9. The gas flow passages 44 extend to a generally cylindrically portion 45 of the spindle head 9, and emerge as a series of staggered and offset gas flow openings 46 provided in the side wall of the cylindrical portion 45.

It can be seen that the end part of the spindle body 3 which carries the flange 5 has been modified and includes a corresponding plurality of gas flow passages 47, the gas flow passages 47 terminating in openings formed in a generally tubular terminal portion of the spindle body 3 which is slidingly mounted on the cylindrical portion 49 of the spindle head 9. The gas flow passages 47 terminate immediately adjacent the blocking ring 26, the blocking ring 26 serving to prevent axial movement of locking element 25.

It is thus to be appreciated that when the spindle body 3 is in an initial position relative to the fixed spindle head 9 the gas flow passages 44 are co aligned with the gas flow passages 47 and, with the spindle 1 in this condition if the pyrotechnic squib 40 is actuated gas will flow through the gas guide 43 and through the co-aligned gas flow passages 44 and 47, the gas thus being applied to the blocking ring 26 and moving the blocking ring from an initial blocking position as shown in FIG. 2 to a release position in which the locking element 25 may move radially outwardly.

It is to be appreciated, however, that if, during an initial stage of an accident, the spindle body 3 rotates slightly with respect to the fixed and locked spindle head 9, and any such movement would be against a resisting force provided by the relatively stiff section 17 of the torsion bar 14, then the gas flow passages 44 will be offset from the gas flow passages 47 due to relative rotation displacement between the gap passages, and on actuation of the pyrotechnic squib 40 no gas will flow through the gas flow passages 47 and thus the blocking ring 26 will remain in its initial condition.

Thus, in the operation of this embodiment of the invention, in any accident situation in which the occupant is relatively light, the level of force applied by the belt 2 to the spindle body 3, after the initial locking of the spindle head 9 will not reach a level corresponding a predetermined torsional deflection of the stiff section 17 of the torsion bar 14 before the crash sensor generates the signal. Thus the spindle body 3 will not move relative to the locked spindle head 9 and the gas flow passages 44 and 47 will remain in co alignment. If a signal is then provided to the pyrotechnic squib 40, the gas from the pyrotechnic squib will move the blocking ring 26 to a release position.

However, for a heavier occupant, a large force is applied to the seat belt 2 very shortly after the initial locking of the spindle head 9, and before the crash sensor generates the signal. The force will exceed the torque of the stiff section 17 of the torsion bar 14, and thus the spindle body 3 will rotate relative to the fixed head 9, with energy being absorbed by the relatively stiff torsion bar 17. Consequently the gas flow passages 44 will be off-set from the gas flow passage 47. Thus on actuation of the squib no gas will flow to the blocking ring 26 and the end result will be that the blocking ring 26 will not be moved to the release position, and only the relatively stiff section 17 of the torsion bar 14 will be operative.

FIGS. 5 to 9 illustrate another embodiment of the invention which again closely resembles the embodiments described above with reference to FIGS. 1 to 4. In the embodiment of FIGS. 5 to 9 a spindle 1 is again of a very similar design to that described above, and again elements 1 to 26 of this embodiment are generally as described in the embodiment of FIG. 1.

It is to be noted in the embodiment of FIGS. 5 to 9 the blocking ring has been slightly modified so as to co-rotate with the spindle body 3. The blocking ring is located adjacent a stop arrangement and can only move past the stop arrangement when in one predetermined relative position, that relative position being the position adopted initially. Thus, on relative rotation having occurred between the spindle body 3 and the locked spindle head 9 the blocking ring can no longer be moved to the release position.

Looking now in more detail at the embodiment of FIGS. 5 to 9, it can be seen that the blocking ring 26 is of generally annular form, but is provided with radially inwardly directed fingers 50 which are slideably recessed in axial grooves 51 formed in the flange 5 provided at the end of the spindle body 3 adjacent the fixed spindle head 9. The blocking ring 26 may thus move axially of the spindle body 3, whilst relative rotation between the blocking ring 26 and the spindle body 23 is prevented by the engagement of the fingers 50 with the axial grooves 51.

However, the blocking ring 26 is also provided with cut outs 53 and 54 formed in the inner circular wall of the annular ring 26. The cut out 53 is relatively shallow and relatively broad whilst the cut out 54 is relatively narrow but relatively deep.

The spindle head 9 is provided with radially outwardly directed stop flanges 55 and 56. The stop flange 55 is relatively short and relatively broad, thus having a configuration corresponding to that of the cut out 53, whereas the stop flange 56 is relatively narrow and relatively long, thus corresponding to the form of the cut out 54.

It is to be understood that a pyrotechnic unit 57 is provided associated with a gas guide 58 which serves to direct gas towards a control ring 59 such that the control ring 59 is moved to a position in which it tends to displace the blocking ring 26 axially of the spindle body 3.

Figure 5:
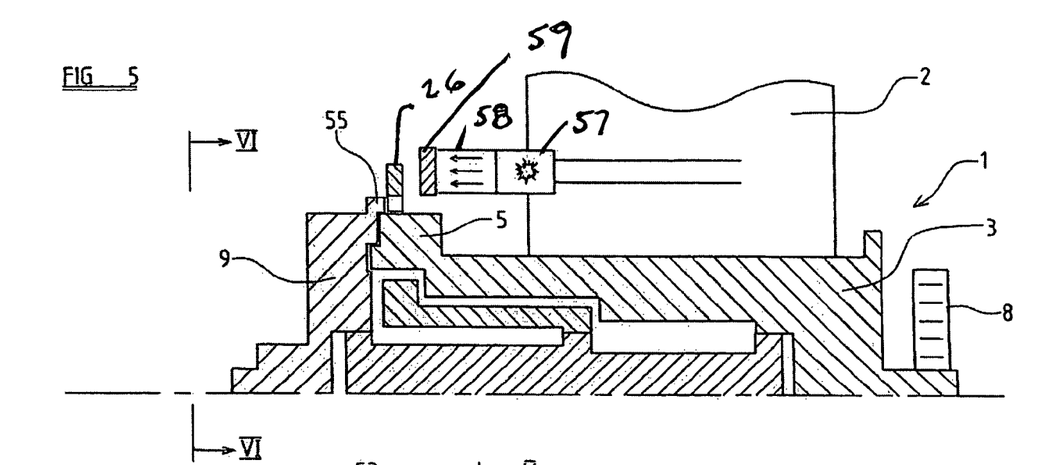
FIG. 5 is a view corresponding to FIG. 1 illustrating a further embodiment of the invention.
Figure 6:
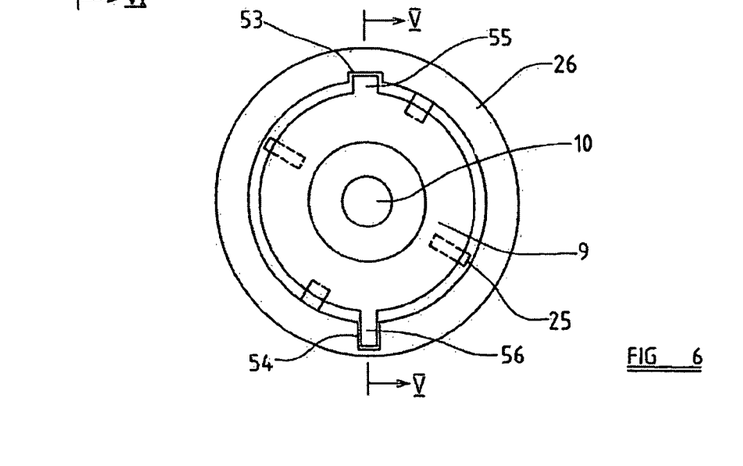
FIG. 6 is a view taken on the line VI-VI of FIG. 5 showing the line V-V of the Section of FIG. 5.
Figure 7:
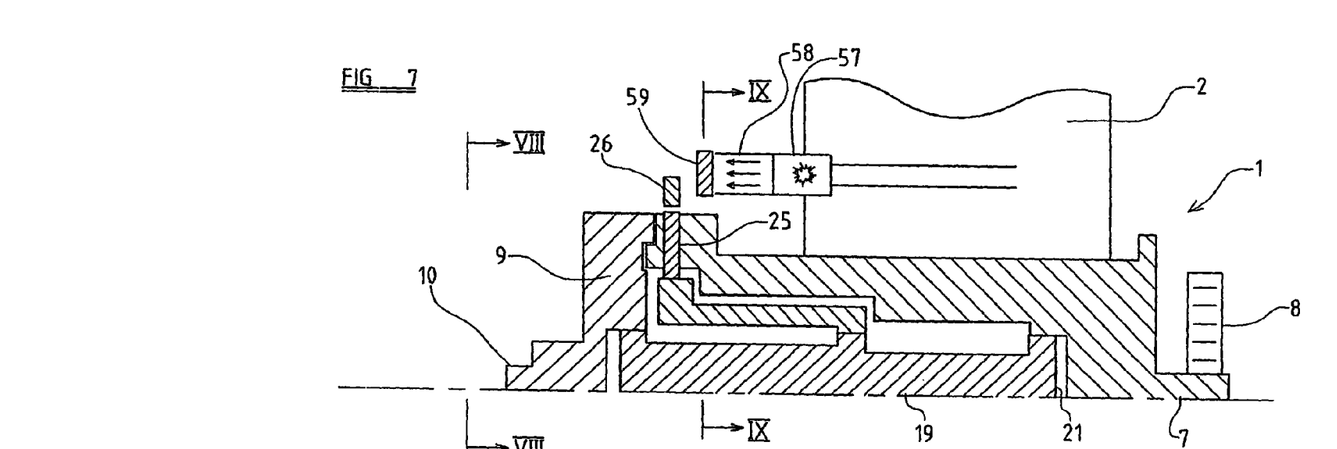
FIG. 7 is a view corresponding to FIG. 5 but taken on a slightly different section and showing the situation that exists after the seat belt has been withdrawn from the retractor.
Figure 8:
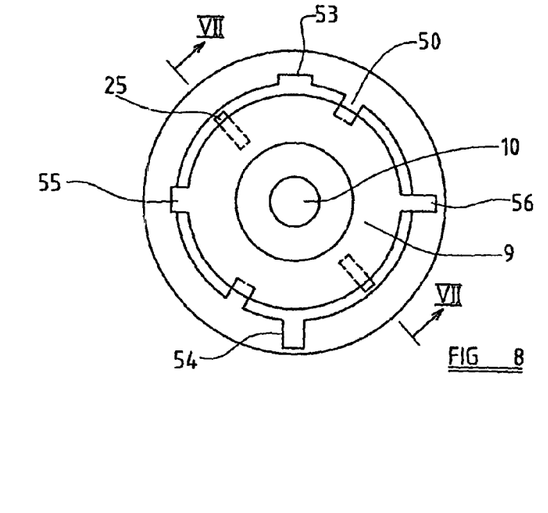
FIG. 8 is a sectional view taken on the line VIII-VIII of FIG. 7 showing the section line VII-VII of FIG. 7.
Figure 9:
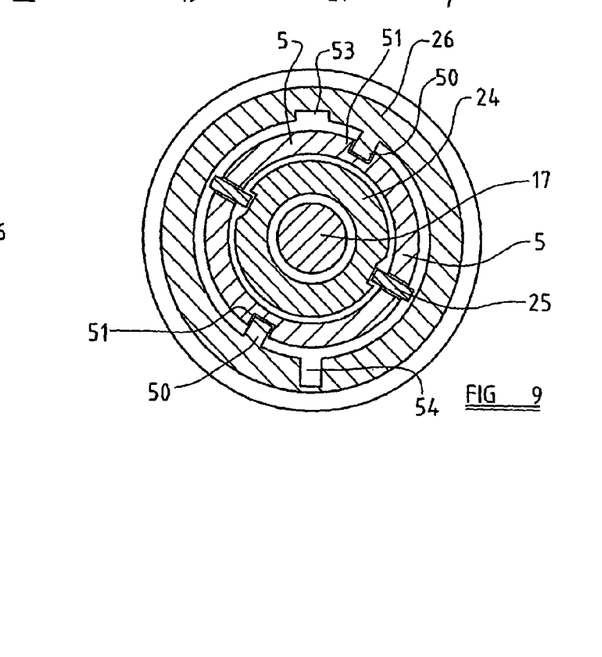
FIG. 9 is a sectional view taken on the line IX-IX of FIG. 7.

It is to be appreciated that with the spindle body 3 in a first relative position, as compared with the spool head 9, the blocking ring 26 may be moved axially away from the initial blocking position, as shown in FIGS. 5 and 6. Thus, as in the earlier described embodiments, if no substantial force is applied to the spindle body, the blocking ring may be moved to a release position, making the soft section 19 of the torsion bar operative. When there has been rotation of the spindle body 3 relative to the fixed head 9, with energy being absorbed by the relatively stiff section 17 of the torsion bar 14, as a consequence of a large force being applied to the spindle body 3 after locking of the spindle head 9, because the cut-outs 53 and 54 will be off-set from the blocking flanges 55 and 56 (as shown in FIG. 8), and the blocking ring 26 may not move to the release position and only the stiff section 17 of the torsion bar 14 will be operative.

Thus, in this embodiment, if, during a preliminary stage in an accident, a very heavy force is applied to the seat belt 2 by a heavy seat occupant before the crash sensor generates the signal, the spindle body 3 will move relative to the locked spindle head 9, and the cut outs 53 and 54 on the blocking ring 26 will not remain aligned with the stop flanges 55 and 56.

However, if only a force less than the torque of the stiff section 14 of the torsion bar is generated before the crash sensor generates a signal, for example in a minor accident or with a light seat occupant, the spindle body 3 will not be rotated relative to the fixed spindle head 9 to a significant degree and the pyrotechnic squib 57 will then be actuated to move the blocking ring 26 to a release position enabling the relatively soft section 19 of the torsion bar 14 to become effective.

Figure 10:
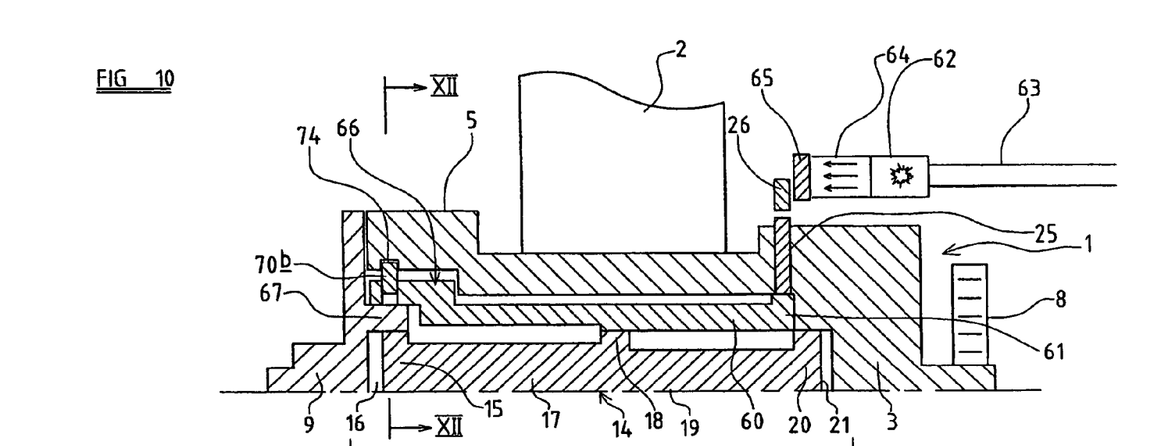
FIG. 10 is a sectional view of the spindle of a further embodiment of a retractor constituting an embodiment of the invention.
Figure 11:
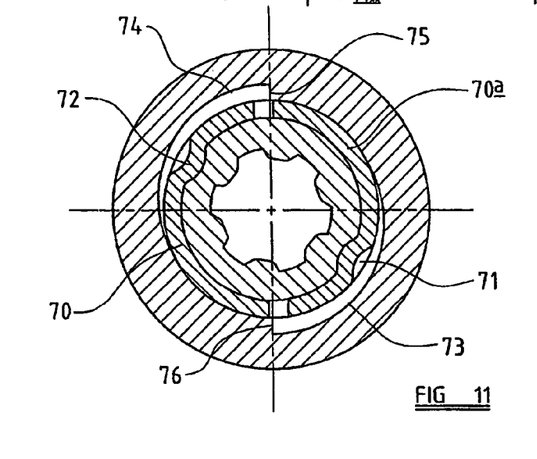
FIG. 11 is a sectional view taken on the line XI-XI of the spindle of FIG. 10 in a first condition.
Figure 12:
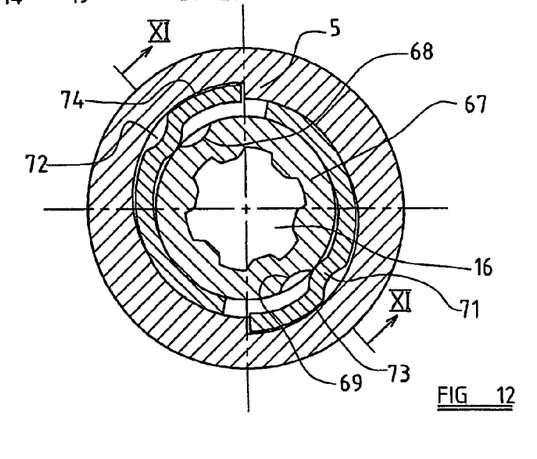
FIG. 12 is a view corresponding to FIG. 11 showing the spindle in a second condition.

Turning now to FIGS. 10 to 12 a further modified embodiment of the invention is illustrated. As in the previously described embodiments, in this embodiment the elements 1 to 26 are generally as described in FIG. 1.

In this embodiment of the invention there are two mechanisms for locking a tube which engages the enlarged diameter central portion 18 of the torsion bar 14, one being releasable, in the manner as described above by moving a blocking ring 26 to enable a locking element 25 to move to a release position, and the other being actuable in response to a predetermined movement of the spindle body relative to the locked spindle head.

Turning initially to FIG. 10, a tube 60 surrounds the whole length of the torsion bar 14. A central portion of the tube 60 is configured to engage with the periphery of the enlarged diameter central portion 18 of the torsion bar 14.

One end 61 of the tube 60, being the end closer to the spring 8, is associated with radially moveable locking members 25 which are associated with a blocking ring 26. Provided adjacent the blocking ring 26 is a pyrotechnic squib 62 which is configured to receive a signal on wires 63. The squib 62 is associated with a gas guide 64 which serves to guide gas from the squib to a control ring 65, so that the control ring 65 may move to displace the blocking ring 26 from an initial blocking position, thus releasing the locking element 25.

The other end 66 of the tube 60 surrounds an axially directed annular flange 67 which is formed on the interior of the spindle head 9. The flange 67 surrounds the recess 16 which receives the end 15 of the torsion bar 14.

The radially outermost exterior of the flange 67 is provided with two diametrically opposed part-cylindrical recesses 68 and 69. The part-cylindrical recesses extend axially of the flange.

The end 66 of the tube is provided with pairs of part-circumferential parallel slits which serve to define two diametrically opposed deformable fingers 70a, 70b, the fingers each circumscribing just under 180° of the outer circumference of the annular flange 67. Each finger is provided with an inwardly depressed region 71 and 72, each inwardly depressed region initially being received within a respective one of the part-cylindrical recesses 68 and 69, as shown in FIG. 11. As will become clear from the following description the fingers 70a and 70b are plastically formable. The flange 5 in this embodiment of the invention can be considered to be of tubular form, surrounding the combination of the flange 67 and the end 66 of the tube 60. The interior of the tubular flange 5 is provided with recesses 73 and 74 which overlie the fingers 70a, 70b, each recess being of increasing radial depth. An abutment wall 75 and 76 which lies in a plane which extends radially is located at the end of each recess.

It is to be understood that, on operation of the embodiment illustrated in FIGS. 10-12, should the seat occupant be heavy causing a substantial force be applied to the spindle body 3 after the spindle head 9 has been locked, the rotational force will be applied to the locking element 25 which engages the end 61 of the tube 60, and the tube 60 will also tend to rotate. Because the tube 60 is connected to the central enlarged diameter portion 18 of the torsion bar 14, the soft part 19 of the torsion bar is effectively inhibited from operating, and the force will be applied to the relatively stiff section 17 of the torsion bar. If the force is sufficiently large, the stiff portion of the torsion bar will tend to twist, absorbing energy.

As the stiff portion of the torsion bar twists, the entire tube 60 will rotate, including the end portion 66 which is effectively trapped between the axially extending flange 67 provided on the spindle head 9 and the generally tubular flange 5 provided on the spindle body 3. As the end 66 of the tube rotates, so the inwardly depressed regions 71 and 72 formed in the fingers 70a and 70b will ride up out of the part-cylindrical recesses 68 and 69, thus plastically deforming the fingers 70a and 70b moving the fingers outwardly into the respective recesses 73 and 74.

If, at a later instant in an accident situation, the squib 62 is actuated to move the control ring 65 so that the blocking ring 26 is moved to a release position, thus enabling the locking element 25 to move outwardly, to release the spindle body from the end 61 of the tube 60, any attempt to pay-out further safety belt will rotate the spindle body 3 and will cause the abutment walls 75 and 76 to be brought into engagement with the adjacent ends of the deformed fingers 70a and 70b which have been moved into the recesses 73 and 74. Thus, as the spindle body 3 rotates to pay out safety belt 2, the tube 60 will co-rotate with the spindle body 3, and because the tube 60 is connected to the enlarged diameter section 18 of the torsion bar 14, the relatively stiff portion of the torsion bar 17 will be effective and will absorb energy.

On the other hand, if no substantial force is applied to the spindle body 3 after the initial locking of the spindle head 9, the fingers 70a and 70b will not be deformed, and the cylindrical part 5 of the spindle may rotate freely around the end 66 of the tube 60. In such a situation, when the blocking ring 26 is moved to the release position, there is no effective connection between the spindle body 3 and the tube 60 and then the only effective connection between the spindle body 3 and the locked spindle head 9 is the torsion bar 14. Thus, any force applied to the spindle body 3 will tend to cause the soft section 19 of the torsion bar to deform, with a relatively low energy absorbance.

It is to be appreciated that in the described embodiments of the invention, when the spindle head is initially locked and a force is applied to the spindle body, if the force is below a predetermined threshold, there is no effective change, and when an appropriate electric signal is generated and the locking element is moved to the release position the soft section of the torsion bar becomes effective whereas, if a force in excess of a predetermined threshold is initially applied to the spindle body, there is a relative movement between the spindle body and the spindle head, this relative movement actuating a mechanical inhibitor arrangement which acts to inhibit operation of the soft section of the torsion bar.

Figure 13:
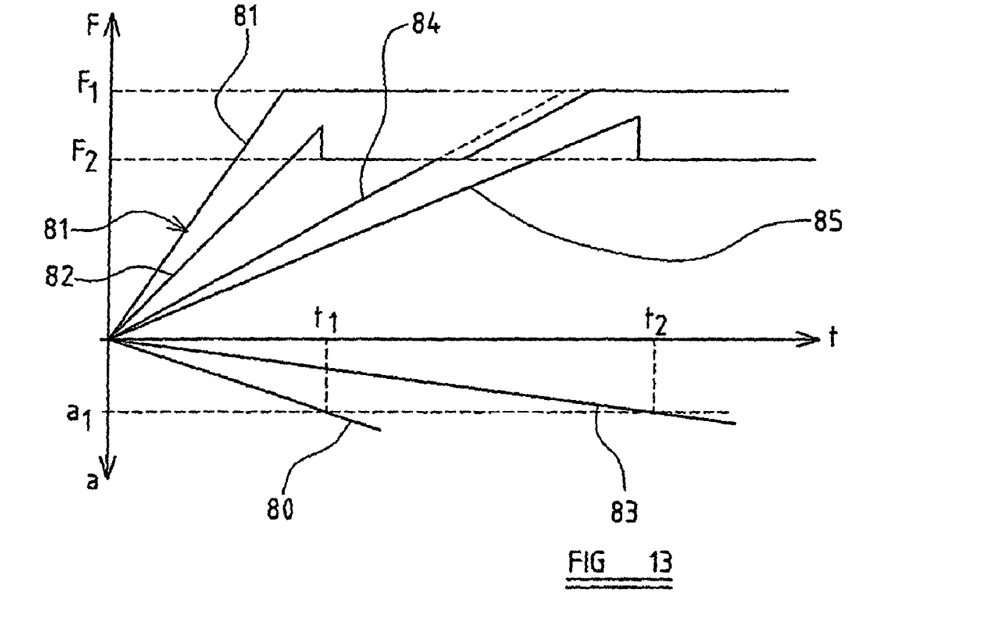
FIG. 13 is a graphical figure provided for the purpose of exploration.

FIG. 13 is a graphic figure illustrating force and acceleration plotted against time.

The force F is marked with two levels, F1 and F2, F1 being the relatively high force associated with the stiff section 17 of the torsion bar and F2 being a lower force associated with the soft section 19 of the torsion bar.

Acceleration extends downwardly, and a threshold acceleration a1 is shown. This is the threshold acceleration sensed by the sensor which generates the crash signal.

In an initial accident which is illustrated in FIG. 13 by the line 80, the acceleration experienced by the sensor is shown, the acceleration being substantial, because of the severity of the accident, and thus passing the threshold a1 and a time t1.

During the period between the commencement of the accident and the time t1 a heavy seat occupant, represented by line 81, will have been thrown forwardly against the seat belt in such a way that very rapidly the force applied to the seat belt 81 rises to the level of the force of the stiff part 17 of the torsion bar. The force experienced by the belt reaches the level F1 associated with the stiff section of the torsion bar before the instant t1. Consequently the stiff section of the torsion bar then becomes operative, and operation of the soft part of the torsion bar is prevented. Consequently the line 81 continues at the level F1, showing that energy is absorbed by the torsion bar at that level during the subsequent moments of the accident.

However, if the seat occupant in the heavy accident is a light seat occupant, as indicated by the line 82, the force exerted by the seat occupant on the seat belt will, between the commencement of the accident and the time t1, only slightly exceed the force F2. Because, at the instant T1, the force has not exceed F1, operation of the "soft" section of the torsion bar 19 is not inhibited and thus, at instant t1 the soft section of the torsion bar becomes operatives, and energy is absorbed at the force level F2.

FIG. 13 also illustrates a soft or gentle accident. In such an accident the acceleration experienced by the sensor is much less than the acceleration experienced for the severe accident, as shown by line 83. Line 83 only reaches the threshold at an instant t2, which is a long time after the instant t1.

Nevertheless, the force applied to the seat belt 2 during this accident by a heavy seat occupant, as shown by line 84, still rises to reach the value F1, the value associated with the stiff part of the torsion bar, before the instant t2 is reached. Also, as shown by the line 85, in this accident the force applied to the safety belt by a light occupant, even at instant t2 has not exceeded the level F1. The force, as illustrated, has exceeded the level F2, but as soon as the instant t2 is reached, the soft section of the torsion bar becomes operative enabling energy to be absorbed at the energy level F2.

Figure 14:
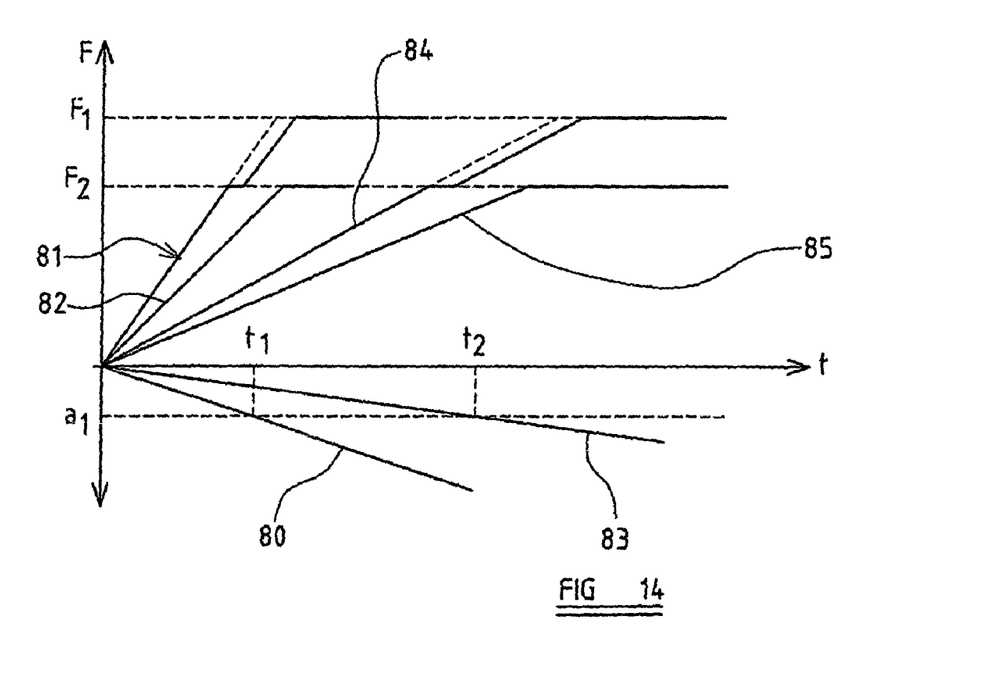
FIG. 14 is a corresponding graphical figure.

FIG. 14 is a view corresponding to FIG. 13, but illustrates the situation that exists in an embodiment of the invention in which there is some play between the torsion bar and the tube. In this embodiment of the invention the force applied to the retractor by the seat belt when a heavy occupant is involved in a severe accident rises swiftly to the level F2. Because there is some play in the system, at this instant, the soft portion of the torsion bar will be twisted slightly as the play is taken up. Thus some energy is absorbed with the force F2. This movement prevents the selection of the low energy level, and the force exerted by the belt continues to rise, past the instant t1, until the force level F1 is reached, when the stiff part of the torsion bar absorbs the energy.

In contrast, for a light seat occupant involved in a severe accident, as shown by line 82, the force exerted by the belt has not reached the level F2 by the instant t1. Thus, the force exerted by the line 82 continues to rise until the level F2 is reached when the energy is then absorbed by the torsion bar. It is to be observed that by using this expedient, the light occupant is never subjected to a force in excess of F2.

Lines 84 and 85 show that a similar situation exists with a severe accident.

Here again the heavy occupant causes the soft part of the torsion bar to twist, due to the "play" in the system, before instant t2, thus inhibiting effective selection of the soft part of the torsion bar. Also the light seat occupant does not exert a force equivalent to the force level F2 until after the instant t2, and thus again is never subjected to a force greater than the force F2.

It is to be appreciated that in all of the described embodiments, any initial movement of the spindle body 3 is effected against an energy absorbing effect provided by the relatively stiff portion 17 of the torsion bar 14. In alternative embodiments of the invention, if initially there is some "slack" or "play" between the enlarged diameter central section 18 of the torsion bar 14 and the tube 23, or between the tube and the locking elements an initial movement of the spindle body 3 may be effected relative to the fixed head 9 with energy being absorbed by the relatively soft portion 19 of the torsion bar 17. This may be preferred in certain embodiments of the invention, where only a relatively low initial force indicates that operation of the soft part of the torsion bar should be inhibited.

Whilst the invention has been described with reference to a spindle for a belt retractor, the invention may be embodied in an energy absorbed associated with a seat belt buckle, or a seat belt pretensioner.

While the above description constitutes the preferred embodiment of the present invention, it will be appreciated that the invention is susceptible to modification, variation, and change without departing from the proper scope and fair meaning of the accompanying claims.

The invention claimed is:

1. A seat belt retractor for a motor vehicle seat belt restraint system for storing seat belt webbing and having a retractor locking device responsive to inertial loads acting on the vehicle, the retractor comprising: a force limiter to permit the restricted paying out of the seat belt webbing with the absorption of energy by deformation of the force limiter, the force limiter having a first section with a relatively high energy absorbing level and a second section with a relatively low energy absorbing level, a control mechanism operable to switch the force limiter from the first energy absorbing level to the second energy absorbing level in response to a crash related electric signal, wherein an initial belt force in excess of a predetermined force causes a deformation of the first section, and the deformation caused by the initial belt force in excess of the predetermined force prior to the electric signal disables the control mechanism, and wherein an initial belt force below the predetermined force does not cause the deformation.

2. A seat belt retractor according to claim 1 wherein the retractor comprises a spindle within the retractor having a first part of the spindle being adapted to be locked from rotating by the locking device, a second part of the spindle having the seat belt webbing wound around it, the second part of the spindle moving relative to the first part when the force limiter is deformed.

3. A seat belt retractor according to claim 2 wherein the force limiter is an energy absorbing torsion bar.

4. A seat belt retractor according to claim 3 wherein the control mechanism incorporates a locking element and an inhibiting element, the inhibiting element engaging part of the torsion bar between the first and the second sections thereof, the locking element initially engaging part of the inhibiting element and the second part of the spindle to secure the inhibiting element to the second part of the spindle, the locking element being moveable to a release position through the control mechanism in which the locking element does not secure the inhibiting element to the second part of the spindle.

5. A seat belt retractor according to claim 4 wherein the locking element is a radially moveable locking element, the locking element initially being retained in an engaged position by means of a blocking element, the control mechanism being configured to move the blocking element and the locking element to a release position in response to the crash related electric signal.

6. A seat belt retractor according to claim 5 wherein the blocking element is in the form of a ring.

7. A seat belt retractor according to claim 5 wherein the control mechanism includes a pyrotechnic squib and the blocking element is moveable in response to the generation of gas by the pyrotechnic squib.

8. A seat belt retractor according to claim 7 wherein the pyrotechnic squib is positioned to direct gas against the blocking element urging the blocking element toward the release position.

9. A seat belt retractor according to claim 7 further comprising a control element, the squib being positioned to direct gas to the control element to move the control element so that the movement of the control element moves the blocking element to the release position.

10. A seat belt retractor according to claim 7 wherein the pyrotechnic squib is associated with at least one first gas duct formed in the first part of the spindle and at least one second gas duct in the second part of the spindle, the first and second gas ducts initially being co-aligned, so that a flow of gas may flow through both of the gas ducts to cause movement of the blocking element, the first part of the spindle being moveable relative to the second part of the spindle in response to the initial belt force in excess of a predetermined value, thus off-setting the gas flow ducts to prevent the flow of gas from moving the blocking element to the release position.

11. A seat belt retractor according to claim 10 wherein there are a plurality of the first gas ducts in the first part of the spindle and a corresponding plurality of the second gas flow ducts in the second part of the spindle.

12. A seat belt retractor according to claim 5 wherein the blocking element is located adjacent a stop, the blocking element in a first orientation being moveable past the stop, the blocking element, in any other orientation from the first orientation, not being moveable past the stop, the orientation of the blocking element being responsive to the relative displacement between the first and second parts of the spindle.

13. A seat belt retractor according to claim 12 wherein the blocking element is in the form of a ring, the ring being provided with at least one inwardly directed finger, the finger being received within an axially extending groove formed in an outer region of the second part of the spindle.

14. A seat belt retractor according to claim 12 wherein the stop is formed on the first part of the spindle.

15. A seat belt retractor according to claim 12 wherein two of the stops are provided at diametrically opposed positions, each of a predetermined configuration, and a ring shaped blocking element is provided with two cut outs of shape and configuration corresponding to the stops.

16. A seat belt retractor according to claim 4 wherein the inhibiting element is provided with a deformable portion which is configured to be deformed in response to the relative movement of the second part of the spindle to a first part of the spindle, the deformable part being positioned to co-operate with a correspondingly configured part of the second part of the spindle to engage the deformable part with the second part of the spindle so as to inhibit effective selection of the one of the second energy level.

17. A seat belt retractor according to claim 16 wherein the deformable part is in the form of a deformable finger, the finger being deformed into a shaped recess provided within the second part of the spindle.

18. A seat belt retractor according to claim 2 wherein a wire is provided to supply the electric signal, at least a portion of the wire extending from the first part of the spindle to the second part of the spindle, the portion of the wire being configured to be broken upon the relative movement of the second part of the spindle relative to the first part.

* * * * *